(12) United States Patent
Engh-Halstvedt

(10) Patent No.: US 9,070,200 B2
(45) Date of Patent: Jun. 30, 2015

(54) GRAPHICS PROCESSING SYSTEMS

(71) Applicant: ARM Limited, Cambridge (GB)

(72) Inventor: Andreas Engh-Halstvedt, Trondhiem (NO)

(73) Assignee: ARM LIMITED, Cambridge (GB)

(*) Notice: Subject to any disclaimer, the term of this patent is extended or adjusted under 35 U.S.C. 154(b) by 113 days.

(21) Appl. No.: 13/875,831

(22) Filed: May 2, 2013

(65) Prior Publication Data

US 2014/0327684 A1 Nov. 6, 2014

(51) Int. Cl.
 G06F 13/00 (2006.01)
 G06T 1/20 (2006.01)
 G09G 5/39 (2006.01)

(52) U.S. Cl.
 CPC .. *G06T 1/20* (2013.01); *G09G 5/39* (2013.01); *G09G 2360/122* (2013.01)

(58) Field of Classification Search
 CPC .. G09G 5/39; G09G 2360/122; G06T 11/001; G06T 15/005
 USPC .......... 345/501, 502, 506, 530, 536, 537, 544
 See application file for complete search history.

(56) References Cited

U.S. PATENT DOCUMENTS

| | | | |
|---|---|---|---|
| 5,905,506 A * | 5/1999 | Hamburg | 345/672 |
| 6,044,178 A | 3/2000 | Lin | |
| 6,380,935 B1 * | 4/2002 | Heeschen et al. | 345/423 |
| 6,466,223 B1 | 10/2002 | Dorbie et al. | |
| 6,614,448 B1 | 9/2003 | Garlick et al. | |
| 6,674,443 B1 | 1/2004 | Chowdhuri et al. | |
| 6,798,421 B2 | 9/2004 | Baldwin | |
| 6,856,320 B1 | 2/2005 | Rubinstein et al. | |
| 6,943,809 B2 * | 9/2005 | Dermer | 345/621 |
| 7,053,893 B1 | 5/2006 | Molnar et al. | |
| 7,102,646 B1 | 9/2006 | Rubinstein et al. | |
| 7,920,139 B2 * | 4/2011 | Nystad et al. | 345/419 |
| 8,059,144 B2 | 11/2011 | Faye-Lund et al. | |
| 8,106,921 B2 | 1/2012 | Nystad et al. | |
| 8,212,832 B2 * | 7/2012 | Stefanidis et al. | 345/543 |

(Continued)

FOREIGN PATENT DOCUMENTS

| | | |
|---|---|---|
| EP | 0829820 A2 | 3/1998 |
| GB | 2353686 | 2/2001 |
| JP | 9-212678 | 8/1997 |

OTHER PUBLICATIONS

Lassen, et al., U.S. Appl. No. 14/267,969, filed May 2, 2014, titled "Graphics Processing Systems,".

(Continued)

*Primary Examiner* — Joni Richer
(74) *Attorney, Agent, or Firm* — Vierra Magen Marcus LLP

(57) ABSTRACT

A tile-based graphics processing system comprises a host processor 1 and a graphics processing pipeline 3. The graphics processing pipeline 3 includes a rasterizer, a renderer, a tile buffer comprising an allocated amount of memory for use as the tile buffer, and a write out stage configured to write data stored in the tile buffer to an external memory. The driver 4 for the graphics processing pipeline 3 on the host processor 1 determines the tile data storage requirements for each render target to be generated for a render output to be generated by the graphics processing system and allocates portions of the memory allocated for use as the tile buffer to respective ones of the render targets based on the determination.

15 Claims, 5 Drawing Sheets

(56) References Cited

U.S. PATENT DOCUMENTS

| | | | |
|---|---|---|---|
| 8,325,203 | B1 | 12/2012 | Donham |
| 2002/0126138 | A1 | 9/2002 | Shekter |
| 2004/0012599 | A1 | 1/2004 | Laws |
| 2006/0033743 | A1 | 2/2006 | Morein |
| 2006/0126736 | A1 | 6/2006 | Shen |
| 2008/0008402 | A1 | 1/2008 | Chang |
| 2008/0303841 | A1 | 12/2008 | Newhall |
| 2011/0080419 | A1 | 4/2011 | Croxford et al. |
| 2012/0280973 | A1* | 11/2012 | Nagy .......................... 345/419 |
| 2013/0155103 | A1 | 6/2013 | Kakarlapudi et al. |
| 2013/0293544 | A1 | 11/2013 | Schreyer et al. |
| 2014/0184623 | A1* | 7/2014 | Frascati et al. ................ 345/522 |

OTHER PUBLICATIONS

Lassen et al., U.S. Appl. No. 13/875,810, filed May 2, 2013, titled "Graphics Processing Systems,".

Nystad, et al., U.S. Appl. No. 13/875,822, filed May 2, 2013, titled "Graphics Processing Systems,".

Ellis, et al., U.S. Appl. No. 14/015,897, filed Aug. 30, 2013, titled "Graphics Processing Systems,".

J.D. Foley et al., "Computer Graphic Principles and Practice," Second Edition in C, 1997, pp. 886-891.

F.I. Parke, "Simulation and Expected Performance Analysis of Multiple Processor Z-Buffer Systems," ACM 1980, pp. 48-56.

Search Report for GB0906691.1, dated Aug. 13, 2009, 1 page.

Deferred shading, Wikipedia, last modified Aug. 26, 2013, available at: http://en.wikipedia.org/wiki/Deferred_shading, 6 pages.

Search Report for GB1121886.4, dated Apr. 20, 2012, 1 page.

Mark et al., "The F-Buffer: A Rasterization-Order FIFO Buffer for Multi-Pass Rendering," SIGGRAPH, 2001, pp. 1-7.

Bavoil et al., "Multi-Fragment Effects on the GPU using the k-Buffer," Scientific Computing and Imaging Institute, Univ. of Utah, ACM SIGGRAPH Symposium on Interactive 3D Graphics and Games, 2007, 8 pages.

Search Report dated Feb. 17, 2015 in GB Patent Application No. GB1415243.3, 3 pages.

Response to Office Action filed Mar. 19, 2015 in U.S. Appl. No. 13/875,810, 16 pages.

Response to Office Action filed Mar. 19, 2015 in U.S. Appl. No. 14/267,969, 17 pages.

Combined Search and Examination Report dated Nov. 4, 2014 in Great Britain Patent Application No. GB1407752.3, 5 pages.

Office Action dated Nov. 19, 2014 in U.S. Appl. No. 14/267,969, 27 pages.

Office Action dated Nov. 19, 2014 in U.S. Appl. No. 13/875,810, 26 pages.

Combined Search and Examination Report dated Nov. 4, 2014 in GB Patent Application No. GB1407756.4, 5 pages.

Combined Search and Examination Report dated Nov. 4, 2014 in GB Patent Application No. GB1407757.2, 5 pages.

* cited by examiner

GRAPHICS PROCESSING SYSTEMS

BACKGROUND

The technology described herein relates to graphics processing systems, and in particular to tile-based graphics processing systems.

As is known in the art, graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

As is known in the art, graphics processing systems and graphics processors are typically provided in the form of graphics processing pipelines which have multiple processing stages for performing the graphics processing functions, such as fetching input data, geometry processing, vertex shading, rasterisation, rendering, etc., necessary to generate the desired set of output graphics data (which may, e.g., represent all or part of a frame to be displayed).

The processing stages of the graphics processing pipeline may, e.g., be in the form of fixed-function units (hardware), or some or all of the functional units may be programmable (be provided by means of programmable circuitry that can be programmed to perform the desired operation). For example, a graphics processing pipeline may include programmable vertex and/or fragment shaders for performing desired vertex and/or fragment shading operations.

A tile-based graphics processing pipeline will also include a so-called tile buffer that stores rendered fragment data at the end of the pipeline until a given tile is completed and written out to an external memory, such as a frame buffer, for use. This local, pipeline memory is used to retain fragment data locally before the data is finally exported to external memory and is typically in the form of on-chip RAM that is set aside for this purpose.

A graphics processing pipeline will typically have a fixed allocation of RAM set aside for use as the tile buffer. This may comprise, for example, one or two colours buffer each of a size adequate to store one rendered tile's worth of colour (RGB or RGBa) data, together with a depth and/or depth and stencil buffer for storing a tile's worth of depth and/or stencil data.

In order to facilitate the writing back of rendered graphics data from the tile buffers to external memory, such as a frame buffer, a graphics processing pipeline will typically include write out circuitry coupled to the tile buffer pipeline memory for this purpose. The graphics processing pipeline may also be provided with fixed-function downsampling circuitry for downsampling the locally stored data before it is written out to external memory where that is required (as may, e.g., be the case where a frame to be displayed is rendered in a super-sampled or multisampled manner for anti-aliasing purposes).

It is becoming increasingly common for applications programmers to wish to generate multiple render targets when generating a given output, e.g. frame for display, for example to provide multiple sets of data values for the frame that can then be used for more sophisticated rendering techniques, such as deferred shading, to generate the final output, e.g. frame. This is commonly known as generating and using multiple render targets (MRT) (with each render target being, for example, one particular set of data values to be used for the final output frame to be generated (and the final output being a further render target)).

One issue that arises in the context of tile-based graphics processors is providing support for generating multiple render targets. This could be done by writing each render target to external memory when it is generated and then reading it back in to the graphics processing pipeline for use, but this is undesirable from a memory bandwidth and power point of view.

The Applicants believe therefore that there remains scope for improved mechanisms for providing multiple render target support in tile-based graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
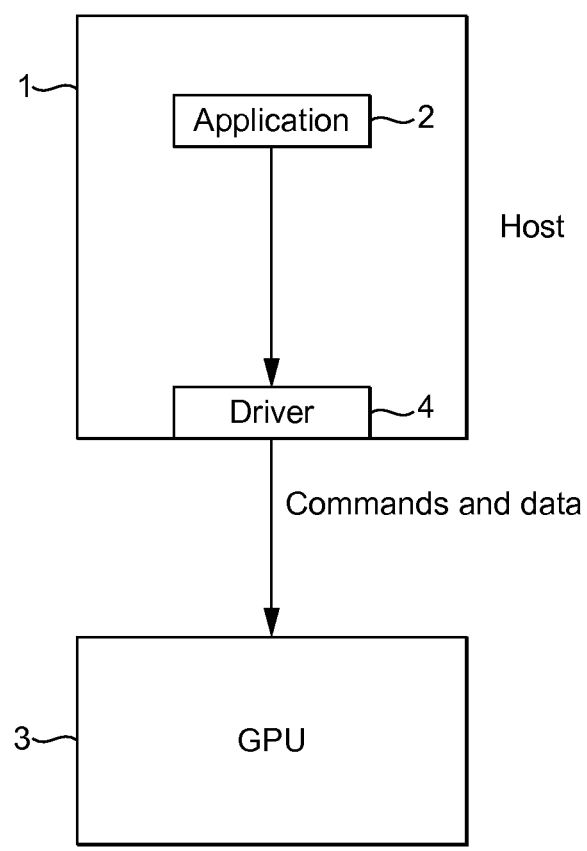
FIG. 1 shows an exemplary computer graphics processing system.

A first embodiment of the technology described herein comprises a tile-based graphics processing system comprising:
  a graphics processing pipeline comprising:
    a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
    a tile buffer configured to store rendered fragment data locally to the graphics processing pipeline prior to that data being written out to an external memory, the tile buffer comprising an allocated amount of memory for use as the tile buffer;
    a write out stage configured to write data stored in the tile buffer to an external memory; and
  wherein the graphics processing system further comprises:
  a memory allocator configured to determine the tile data storage requirements for each render target to be generated for a render output to be generated by the graphics processing system and operable to allocate portions of the memory allocated for use as the tile buffer to respective ones of the render targets based on the determination.

A second embodiment of the technology described herein comprises a method of operating a tile-based graphics processing system that comprises:
  a graphics processing pipeline comprising:
    a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
    a tile buffer configured to store rendered fragment data locally to the graphics processing pipeline prior to that data being written out to an external memory, the tile buffer comprising an allocated amount of memory for use as the tile buffer; and
    a write out stage configured to write data stored in the tile buffer to an external memory;
  the method comprising:
    when the graphics processing system is to generate a render output:
      determining the tile data storage requirements for each render target to be generated for the render output;
      allocating portions of the memory allocated for use as the tile buffer to respective ones of the render targets based on the determination; and
      the graphics processing pipeline when generating rendered tile data for a respective render target for the render output, storing the rendered tile data in the portion of the tile buffer allocated to that render target.

The graphics processing system of the technology described herein includes a memory allocator that is operable to dynamically (in use) apportion the available tile buffer memory between different render targets, based on the determined data storage requirements for the render targets. This provides a more flexible system that can allow, for example, a tile-based graphics processing pipeline to more readily and more efficiently support multiple render target rendering.

The rasteriser of the graphics processing pipeline will, as is known in the art, generate graphics fragments to be rendered to generate rendered graphics data for sampling points of the desired graphics output, such as a frame to be displayed. Each graphics fragment that is generated by the rasteriser has associated with it a set of sampling points of the graphics output and is to be used to generate rendered graphics data for one or more of the sampling points of the set of sampling points associated with the fragment.

The rasteriser may be configured to generate the fragments for rendering in any desired and suitable manner. It will, as is known in the art, receive e.g. primitives to be rasterised, test those primitives against sets of sampling point positions, and generate fragments representing the primitives accordingly.

The renderer should process the fragments generated by the rasteriser to generate rendered fragment data for (covered) sampling points that the fragments represent, as is known in the art. These rendering processes may include, for example, fragment shading, blending, texture-mapping, etc. In an embodiment the renderer is in the form of or includes a programmable fragment shader.

The tile buffer comprises an allocated amount of memory that is set aside for this purpose. It is in an embodiment all or part of a local, on-chip RAM of the graphics processing pipeline. The tile buffer will store, as is know in the art, an array or arrays of sample values for the tile in question. The tile buffer will store data values for an array of sample positions, with respective sets of the sample positions corresponding to and being associated with respective pixels of an output data array that the rendered fragment data relates to;

These sample values are usually, and in an embodiment are, grouped into sets of sample values (such as groups of 2×2 sample values) that are each associated with a respective (e.g. display) pixel in the tile in question. The sample values may, e.g., comprise colour values (a colour buffer), depth values (a depth buffer), etc.

The tile buffer is configured to be able to (and configurable to) store multiple render targets simultaneously.

The write out unit operates to write the data in the tile buffer (once the data in the tile buffers is complete) out to external (main) memory (e.g. to a frame buffer), as is known in the art. This may include, as is known in the art, downsampling (averaging), either in a fixed or in a variable fashion, the sample values in the tile buffer to the final output (pixel) value to be written to the main memory (e.g. frame buffer) and/or other output, if desired.

The tile buffer memory allocator can be, and the tile buffer memory allocation process can be performed by any suitable stage and component of the graphics processing system. In an embodiment the driver for the graphics processing pipeline performs the determination and tile buffer memory allocation (the driver is the memory allocator). This is advantageous as the driver has access to all the information needed to determine the tile buffer memory requirements, can generate any necessary data structures and commands to ensure that the memory allocations are used correctly, and, moreover, can do this transparently from the application's and the application programmer's perspective.

The amount of tile data that will need to be stored for a render target can be determined as desired. It may be based, e.g. on the data to be generated for the render target in question (e.g. whether it is colour data and of what format, etc.), the tile size being used, and any other parameters that could affect the amount of data to be stored.

In an embodiment, the render output requires multiple render targets. In this case, the amount of tile data to be stored for each render target should be determined, and then memory space within the tile buffer allocated accordingly. Thus, the number of render targets to be generated is in an embodiment also taken into account when determining the tile buffer allocations.

The tile buffer is in an embodiment apportioned between the different render targets by allocating different addresses within the tile buffer memory space to the render targets. Thus, the process in an embodiment allocates to each render target a particular, different (and in an embodiment exclusive (not shared)) set of memory addresses. Each render target is in an embodiment allocated a contiguous set of memory addresses within the tile buffer. The allocation is in an embodiment indicated by indicating a start address for the memory region to be used for the render target in question, in an embodiment in the form of an offset from a start address for the tile buffer.

The portions of the tile buffer that are allocated to each render target should correspond to and be based on the amount of tile data it has been determined will need to be stored for the render target in question. Each render target can have a different size (amount of memory allocated) and/or format in the tile buffer, as required for the particular render target.

The graphics processing pipeline should store the render target data it generates in the appropriate region of the tile buffer. This can be achieved as desired, but in an embodiment each render target has state information in the form of a render target descriptor associated with it that indicates the tile buffer region that data for the render target in question should be written to. The processing stages of the graphics processing pipeline can then use this state information to determine where to store the rendered tile data for the render target in question. Thus, each render target to be generated in an embodiment has a render target descriptor associated with it. In an embodiment the system supports up to a selected, predetermined maximum number of render targets (e.g. 8) and so there will be a predetermined number of render target descriptors.

To facilitate the use of the render target state information, the graphics processing system is in an embodiment configured such that any commands, etc., that can trigger the writing of data into the tile buffer can also indicate (e.g. by means of a given parameter) the render target that is being written to. In an embodiment an API mechanism that allows shader programs to specify which render target(s) they output data is used for this.

The render target descriptors are in an embodiment generated by the memory allocator (e.g. the driver) when allocating the tile buffer memory.

As well as indicating the tile buffer location for the render target in question, the render target state information (descriptors) in an embodiment also indicates the format that the data for the render target is to be stored in (e.g. in terms of the number of bits per pixel).

In an embodiment, the render target state information also indicates whether (write back enable) and where the render target data should be written to in external memory and how the data should be written out to external memory (e.g. in what format it should be written out, whether any compression is to be performed, etc.). This information can then be and is in an embodiment used by the tile write out unit when writing the render target data out to external memory. In an embodiment, the tile write out unit iterates over the different render targets in turn, one after another, writing them out to external memory (e.g. a frame buffer for a display) as required.

In an embodiment, as well as the render target descriptors, a frame buffer descriptor (state information) that contains state information that is common to all the render targets for the render output being generated is also generated (again, in an embodiment by the memory allocator, e.g. driver). This frame buffer descriptor in an embodiment indicates the tile size being used (and for a given render output, the same tile size is in an embodiment used for all the render targets in the tile buffer for that output). The frame buffer descriptor may also include one or more of: the number of render targets, and the size of the frame buffer as a whole.

In an embodiment, if it is determined that the render targets for a given render output will not use all the tile buffer memory allocation, it is determined whether a further render output can also be accommodated in the tile buffer and if so, the tile buffer memory is apportioned accordingly and the graphics processing pipeline is controlled to process both render outputs into the tile buffer simultaneously. This can be done for more than two render outputs where the tile buffer can accommodate the required tile data. Thus the graphics processing pipeline can in an embodiment process multiple tiles and have multiple tiles "in flight" at the same time.

In an embodiment, if it is determined that the render target or targets for a given render output will require more than the available (or more than the remaining available) space in the tile buffer, the memory allocator can operate to sub-divide the tiles to be generated for the render output into plural smaller sub-tiles that will fit within the tile buffer, and then control the graphics processing pipeline to generate each respective sub-tile (in turn). Thus, for example, a 16×16 tile that is too large to fit within the tile buffer can instead be processed, e.g. as four 8×8 tiles. The frame buffer descriptor can, e.g., be used to indicate the tile size to be generated, thereby controlling the tile size that the graphics processing pipeline will produce, and the, e.g., driver can include appropriate commands in the command list for the graphics processing pipeline to cause it to generate the plural smaller sub-tiles required for each "original" tile. For example, the driver may select the tile size and memory allocation, and the graphics processing pipeline then do everything else needed to handle the multiple sub-tiles. As this is done within the graphics processing system itself, this can be done without the specific input of and transparently to the application and the application programmer.

This arrangement is particularly advantageous for providing multiple render target support in tile-based graphics processing pipelines, as it facilitates flexibly allowing the multiple render targets to be fitted within the available tile buffer memory.

Thus, another embodiment of the technology described herein comprises a tile-based graphics processing system comprising:
   a graphics processing pipeline comprising:
      a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
      a tile buffer configured to store rendered fragment data locally to the graphics processing pipeline prior to that data being written out to an external memory, the tile buffer comprising an allocated amount of memory for use as the tile buffer; and
      a write out stage configured to write data stored in the tile buffer to an external memory;
   wherein the graphics processing system further comprises:
      a memory allocator configured to determine the tile data storage requirements for each render target to be generated for a render output to be generated by the graphics processing system and operable to cause the graphics processing pipeline to process each tile to be generated for the render output as a plurality of smaller sub-tiles based on the determination.

Another embodiment of the technology described herein comprises a method of operating a tile-based graphics processing system that comprises:
   a graphics processing pipeline comprising:
      a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
      a tile buffer configured to store rendered fragment data locally to the graphics processing pipeline prior to that data being written out to an external memory, the tile buffer comprising an allocated amount of memory for use as the tile buffer; and
      a write out stage configured to write data stored in the tile buffer to an external memory;
   the method comprising:
      when the graphics processing system is to generate a render output:
      determining the tile data storage requirements for each render target to be generated to generate the render output;
      if the determined tile data storage requirements exceed the available tile buffer memory capacity, dividing each tile to be generated for the render output into a plurality of smaller sub-tiles based on the determination; and
      the graphics processing pipeline generating the render output as the plurality of smaller sub-tiles.

As will be appreciated by those skilled in the art, these embodiments of the technology described herein can and in an embodiment do include any one or more or all of features of the technology described herein described herein. Thus, for example, the size of the sub-tiles to be generated is in an embodiment indicated in state information that will be used by the graphics processing pipeline.

The technology described herein can be used wherever multiple render targets are to be generated. However, it is envisaged that the technology described herein may have particular application for deferred shading. Thus, in an embodiment, the render targets are render targets that are being generated as a part of a deferred shading operation. In an embodiment, the render targets include both the input data for the deferred shading operation and a render target that is to be the output of the deferred shading operation.

In an embodiment, the graphics processing pipeline includes a programmable processing stage operable to, in response to one or more graphics program instructions, read data stored in the tile buffer, perform a processing operation using the read data, and write the result of the processing operation into the tile buffer or to an external memory. This, in combination with the multiple render target support provided by the technology described herein can then allow deferred shading operations to be performed "on-chip" within the graphics processing pipeline, thereby avoiding the need to write data to and read data from external memory when performing deferred shading.

In such an embodiment, the programmable processing stage is operable to, under the control of graphics program instructions, read data from two or more of a set of multiple render targets stored in the tile buffer, perform a processing operation using the read data, and to write the result of the processing operation to an output render target in the tile buffer, or to external memory.

The programmable processing stage that processes the data in the tile buffer may comprise any suitable programmable hardware element such as programmable processing circuitry. This programmable processing stage may be provided as a separate circuit element to other programmable stages of the processing pipeline such as a fragment shader. However, it may also be at least partially formed of shared programmable graphics processing circuitry. In an embodiment both the renderer and the programmable processing stage share programmable processing circuitry and in an embodiment comprise the same physical circuit blocks (that are then differently programmed to serve as the fragment shader (renderer) and the programmable processing stage).

The programmable processing stage operates in response to and under the control of graphics program instructions. Thus, the programmable processing stage is in an embodiment operable to, in response to and under the control of graphics program instructions, read data values from at least two (and in an embodiment all) of the stored input data value render targets for the tile in question, perform a processing operation on those data values, and then write the output result to a further render target in the tile buffer or to external memory.

Similarly, in an embodiment, the method of the technology described herein comprises issuing graphics program instructions to the programmable processing stage to cause the programmable processing stage to, for plural render targets for which data is stored in the tile buffer, read data stored in the tile buffer for each of the render targets, perform an, e.g., deferred shading, processing operation using the read data and write the result of the processing operation into the tile buffer or to an external memory; and the programmable processing stage in response to the graphics program instructions, for the respective plural render targets for which data is stored in the tile buffer, reading data stored in the tile buffer for each of the render targets, performing a processing operation using the read data and writing the result of the processing operation into the tile buffer or to an external memory.

The processing operation of the programmable processing stage is in an embodiment achieved by executing one or more graphics processing threads using the programmable graphics processing stage, in an embodiment before the output values are written to the frame buffer memory. Thus, fragment data values generated within the graphics processing pipeline and stored within the tile buffer are further processed by the programmable processing stage to provide output results using graphics processing threads executed by the programmable processing stage that operate on the data values within the tile buffer without requiring a write out to any external memory.

Thus, the programmable processing stage in an embodiment comprises programmable graphics processing circuitry that executes respective graphics processing threads (under the control of graphics program instructions). Each thread in an embodiment processes a respective pixel (pixel position) within the tile buffer. For a given tile, some or all of the pixel positions may be processed, as desired.

The programmable processing stage that reads values from the tile buffer in an embodiment operates in a similar manner to other programmable stages of the processing pipeline, such as a fragment shader, but is able to read and in an embodiment write to the tile buffer (directly).

The programmable processing circuitry may read sample values associated with the same pixel position in each render target for the tile being processed. This may be appropriate where, for example, the deferred shading operation is a deferred lighting operation.

Alternatively or additionally, the programmable processing stage may read sample values associated with different pixels in each render target (i.e. effectively may be configured to be able to use random access to the multiple render targets stored in the tile buffer). This may be appropriate where more complex deferred shading operations are being performed.

Thus, in an embodiment, the programmable processing stage is able to read values from the tile buffer to, for respective pixel positions that data stored in the tile buffer represents, read data stored in the tile buffer for one or more sampling positions that are not associated with the pixel position in question, and perform a processing operation using the read sampling position data (under the control of appropriate graphics program instructions). This means that the programmable processing stage when performing a processing operation for a given pixel position (when executing a thread for a given pixel position) is not constrained to read (use) only the sample values in the render target (or targets) associated with that pixel position, but can read (and use) sample values associated with other pixel positions as well. In other words, the programmable processing stage effectively has access to the tile buffer on a "random access" basis, rather than, e.g., only having very limited access to only the current pixel's data.

Thus the programmable processing stage, when executing a graphics processing thread to generate a result for a given pixel (pixel) position in an embodiment reads and uses at least one sample value stored in the or in each render target that is associated with a different pixel (pixel position) (to the given pixel (pixel position)). In an embodiment, sample values from plural different pixels (pixel positions) are read and used.

The programmable processing stage could read a single sample value from each render target for a respective processing operation, or it could read a plurality of sample values from each input data render target as inputs to its processing operation (these may all be for the same pixel position but in an embodiment are for plural different pixel positions). Thus the programmable processing stage can in an embodiment read sample values associated with multiple pixels from one render target, as well as associated with pixels from multiple render targets. The processing operation executed by the programmable processing stage may generate a single or plural output values.

The programmable processing stage can write the results of its processing operations back to the tile buffer and/or to external memory. In an embodiment, where the programmable processing stage can write the results of its processing directly to external memory, it can do this using a generic load/store to memory from the programmable processing stage.

In an embodiment, the programmable processing stage writes the results of it processing operation on the data values in the tile buffer to a further render target in the tile buffer that has been allocated to receive and store the results of the processing operation. This further, result render target is then in an embodiment written out to external memory subsequently, but it may be read back in by the programmable processing stage for further processing operations if desired. The result render target could be written out to external memory by triggering fixed function write out from the tile buffer.

Where the results are written back to the tile buffer, the programmable processing stage can in an embodiment write the results to one or more than one sampling and/or pixel position in the output render target in the tile buffer, and in an embodiment to the respective and/or to one or more different pixel positions in the output render target (under the control of appropriate graphics program instructions). Thus, the programmable processing stage can in an embodiment write the results to any location in the render target (and not just either the current location (pixel position) or the location(s) (pixel position(s)) that the data is being read from). It may also write the results to more than one "output" render target in the tile buffer, if desired. Thus, in an embodiment, the programmable processing stage supports at least one of, and in an embodiment both of, multiple render target inputs and multiple render target outputs.

Thus the programmable processing stage is in an embodiment configured to be able to have full read access to every pixel and sample in the tile buffer (without generating bandwidth traffic to external memory). It is in an embodiment also then correspondingly able to have full write access to pixels and samples in the tile buffer without generating bandwidth traffic to external memory.

Similarly, in an embodiment the programmable processing stage is operable to, in response to graphics program instructions, read for use as input to its process sample values from plural different pixels within the stored render target tiles in question, and/or to write its output results to sample values associated with plural different pixels in the output render target(s) in the tile buffer.

In an embodiment, the programmable processing stage that is operable to read values from the tile buffer is configured also to be able to read values from external memory (and have full random access to external memory). This may be achieved, e.g., by providing appropriate program instructions to the programmable processing stage.

In an embodiment, fixed function write out of a specific tile and/or render target from the tile buffer can be prevented. This may be useful where, for example, the data stored in a tile and/or render target is not in practice needed externally to the graphics processing pipeline, or that data may be written out by other means, such as by the programmable processing stage doing the write out using external memory accesses. Preventing the fixed function write out of a tile and/or render target could be performed on a static basis (i.e. predetermined to statically have write out disabled), or it could be preventable on a dynamic basis (in use). Similarly, the fixed function write out of a tile and/or render target could be, e.g., prevented across all the tiles in common, or selected dynamically, on a per tile basis.

In an embodiment, the programmable processing stage can operate to prevent fixed function write out of a specific render target from the tile buffer. This is in an embodiment in response to a particular graphics program instruction to the programmable processing stage. This will then allow an application programmer, for example, to optionally prevent fixed function write out of a specific render target from the tile buffer, e.g. on a per tile basis.

The operation of the programmable processing stage is in an embodiment triggered by including an appropriate command in the tile list of the tile or tiles for which the processing operation is to be performed. In response to this command, the graphics processing pipeline in an embodiment first waits until all fragment processing operations (fragment shaders) in flight are committed to the tile buffer (i.e. until the rendering of fragments for all the input data render targets for the tile has been completed—this ensures that the data in the tile buffer is complete before the tile buffer data processing operation is commenced). The programmable processing stage then executes its processing operation on the values in the render targets in the tile buffer. This is in an embodiment done by spawning a given number of threads with an input vector distinguishing them (the input vector could for instance represent the region of the tile (render target) that the thread is supposed to be working on). Then, once all the tile buffer render target data processing threads have completed, "normal" rendering can be resumed as usual.

In an embodiment, it is also possible for the programmer to signal on the pipeline that the processing of the values in the tile buffer by the programmable processing stage has been completed, so that further rendering operations can then be performed.

In an embodiment, an API (Application Programming Interface; the interface through which an application can use this feature) mechanism is used to trigger and control the operation of the programmable processing stage. For example, appropriate API calls and commands can be configured to trigger the respective tile buffer data processing operation, and the addition, e.g., of appropriate commands to the tile lists for the tiles in question.

For example, a "begin tile processing" command could be added to the tile (command) lists of the affected tiles in response to a particular API call which invokes the tile buffer data processing operation (and in an embodiment, this is what is done). This API call in an embodiment also specifies the region of the screen that the tile buffer data processing operation is to operate on.

Where the programmable processing stage is being used to perform a deferred shading operation, the deferred shading operation can be any suitable and desired deferred shading operation.

The rendering of the plural input data render targets containing the data for the deferred shading operation can be triggered and performed as desired, e.g. and in an embodiment, by triggering appropriate rendering operations in the normal manner for the graphics processing pipeline in question. As is know in the art, the input data render targets for the deferred shading operation may include colour data, depth data, surface normals, other attributes, etc.

The multiple render targets will then be stored in the tile buffer in the manner of the technology described herein.

Once a given set of input data render targets has been stored in the tile buffer, the programmable processing stage then uses that data to perform the deferred shading operation. This operation is in an embodiment triggered by including appropriate commands in the tile list for the tile in question, as discussed above. The programmable processing stage will then read data from some or all of the multiple render targets, process that data and write the result to a further render target in the tile buffer or directly to external memory.

As will be appreciated by those skilled in the art, this process will be repeated for each tile of the overall render output, e.g. frame, to be generated, until the final output, e.g., frame has been completed (and written to external memory).

In an embodiment, when performing deferred shading, the writing out of the initial, input data render targets from the tile buffer is prevented, such that only the final output render target is written out from the tile buffer when the data is written out to external memory from the tile buffer (i.e. the arrangement is such that only the final (output result) render target is written to external memory). This then also saves on write bandwidth for those render targets and the memory footprint of those render targets in the external memory. This will then allow deferred shading and lighting to be performed in a particularly bandwidth efficient manner, as it can allow the entire deferred shading process to be done on the pipeline on a tile-by-tile basis, with zero external bandwidth cost.

In this case, preventing the fixed function write out of the render targets could be performed on a static basis (i.e. predetermined to statically have write out disabled), or it could be preventable on a dynamic basis (in use), as discussed above.

In an embodiment, the programmable processing stage operates to disable and prevent the fixed function write out of the input data set of render targets to external memory (e.g. and in an embodiment, in the manner discussed above).

In addition to the specific processing stages mentioned above, the graphics processing pipeline may otherwise contain any suitable and desired processing stages that a graphics processing pipeline may contain, such as an early depth (or an early depth and stencil) tester; a late depth (or depth and stencil) tester; a blender; etc.

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

FIG. 1 shows a typical computer graphics processing system. An application 2, such as a game, executing on host processor 1 will require graphics processing operations to be performed by an associated graphics processor 3. To do this, the application will generate API calls that are interpreted by a driver 4 for the graphics processor 3 that is running on the host processor 1 to generate appropriate commands to the graphics processor 3 to generate the graphics output required by the application 2.

Figure 2:
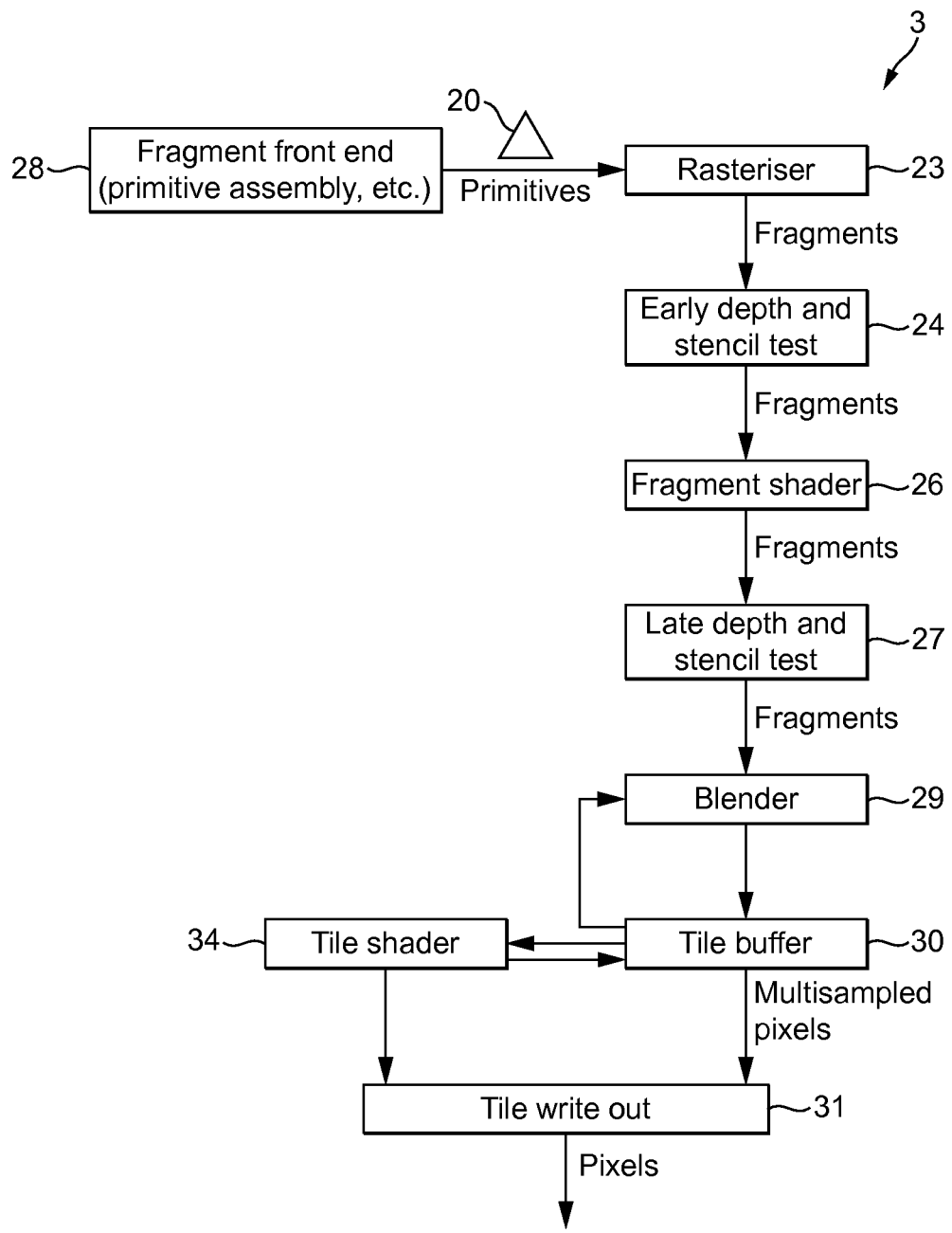
FIG. 2 shows schematically a graphics processing pipeline that can be operated in the manner of the technology described herein.

FIG. 2 shows the graphics processor 3 of the present embodiment in more detail.

The graphics processor 3 shown in FIG. 2 is a tile-based graphics processing pipeline and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

FIG. 2 shows schematically the pipeline stages after the graphics primitives (polygons) 20 for input to the rasterisation process have been generated. Thus, at this point the graphics data (the vertex data) has undergone fragment front-end operations 28, such as transformation and lighting operations (not shown), and a primitive set-up stage (not shown) to set-up the primitives to be rendered, in response to the commands and vertex data provided to the graphics processor, as is known in the art.

As shown in FIG. 2, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates, as is known in the art, to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs, is known in the art, a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z-buffer within the tile buffer 30. (The colour buffer and Z-buffer will store, as is known in the art, an appropriate colour, etc., or Z-value, respectively, for each sampling point that the buffers represent (in essence for each sampling point of a tile that is being processed).) The colour buffer and Z-buffer store, as is known in the art, an array of fragment data that represents part of the render output (e.g. image to be displayed).

In the present embodiment, the tile buffer 30 comprises an allocated portion of RAM that is located on (local to) the graphics processing pipeline (on-chip). The way that this memory is allocated to respective tiles when rendering in the present embodiment will be discussed in more detail below.

The, e.g. colour, data from the tile buffer 30 is input to a downsampling (multisample resolve) write out unit 31, and thence output (written back) to an output buffer, such as a frame buffer of a display device (not shown). (The display device could comprise, e.g., a display comprising an array of pixels, such as a computer monitor or a printer.)

The downsampling unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed).

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

In the present embodiment, the tile buffer 30 consists of an allocated portion of RAM. Then, when a given render output is to be generated, the driver 4 on the host processor 1 determines the allocation of the memory space within the tile buffer to the colour buffer or buffers, etc. that may be required for the render output to be generated. This allows the driver 4 to flexibly allocate the available tile buffer memory on a render output by render output basis.

To do this, the driver 4, when it receives commands to generate graphics output, uses the information from the application about the output to be generated, such as the number of render targets, the data format for each render target, etc., to determine the memory capacity that will be needed to store the data for one tile for each render target in the tile buffer and then allocates memory space within the tile buffer 30 to each render target accordingly.

Figure 3:
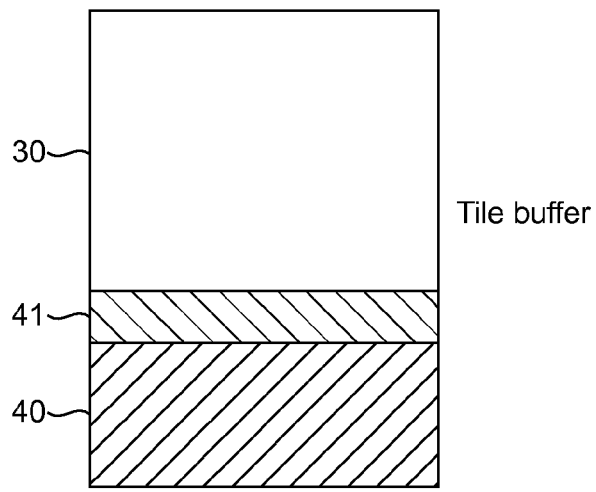
FIGS. 3 and 4 show schematically an embodiment of the operation of the graphics processing system of FIG. 1.
Figure 4:
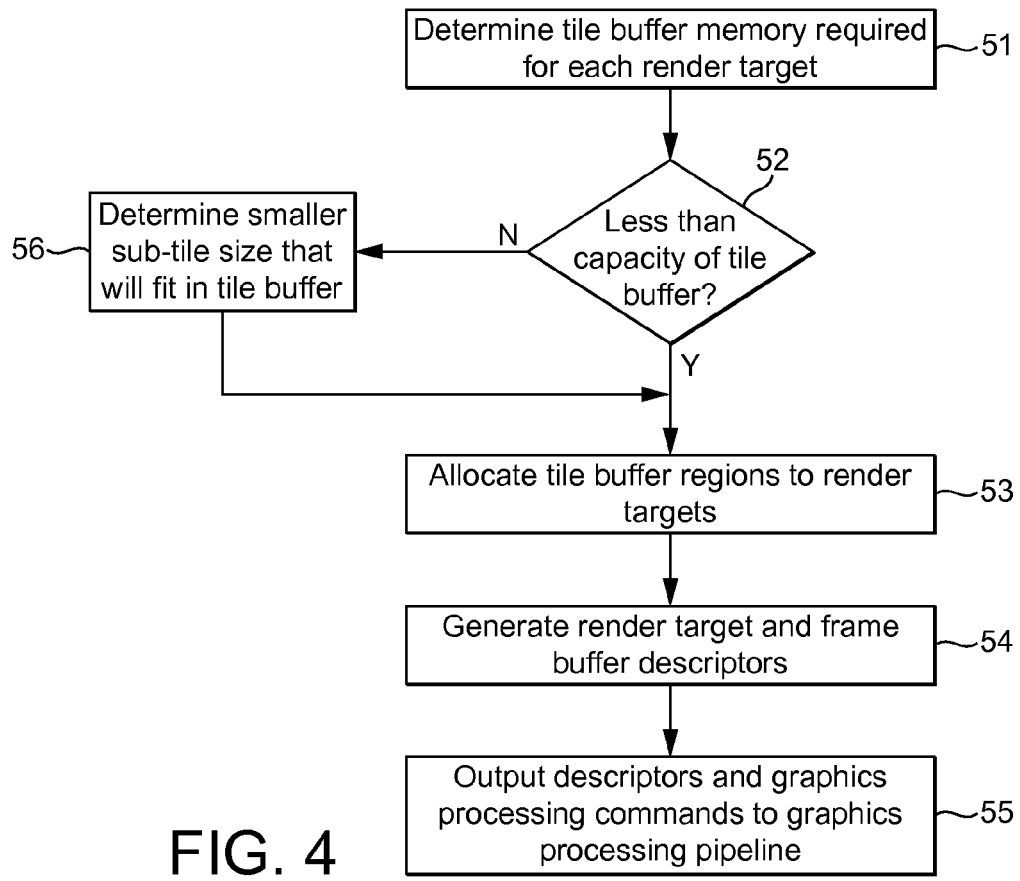

FIG. 3 illustrates this process and shows an exemplary tile buffer 30 whose memory allocation has been apportioned between two render targets 40 and 41. These render targets may, for example, comprise a set of colour data and a set of stencil data for the tile in question (and thus, as shown in FIG. 4, have different memory requirements).

The tile buffer memory for each render target required for the tiles of the render output in question is allocated as a contiguous set of memory addresses within the RAM.

The driver 4 also generates and stores a respective render target descriptor for each render target to be generated for the render output being generated. Each render target descriptor indicates the memory address in the tile buffer where the render target's data is to be stored, the format that the data is to be stored in the tile buffer 30, where the render target data is to be written out to when it is written out of the tile buffer 30, and any format or other instructions to be followed when writing the data out from the tile buffer 30.

The driver 4 also generates and stores a frame buffer descriptor for the render output to be generated. This indicates state information that is common to all the render targets to be generated for the render output, such as the tile size being used, the size of the frame buffer as a whole, the number of render targets, etc.

The render target descriptors and the frame buffer descriptor are then provided to the graphics processing pipeline 3 along with the commands to generate the render targets and the render output.

The graphics processing pipeline 3 then generates the render targets and the render output in the manner discussed above, using the render target descriptors and frame buffer descriptor to determine where and how to store each tile of the render targets in the tile buffer 30. The write out unit 31 correspondingly uses the render target descriptors to determine how and where to write the render targets out from the tile buffer 30 once they have been completed.

In the present embodiment the driver 4, if it determines that the tiles for the render targets for a given render output will not use all the tile buffer memory allocation, then determines whether a further render output can also be accommodated in the tile buffer and if so, controls the graphics processing pipeline to process both render outputs into the tile buffer simultaneously.

The driver 4 will also, if it determines that the tiles for a render target or targets for a given render output will require more than the available (or more than the remaining available) space in the tile buffer 30, operate to sub-divide the tiles to be generated for the render output into plural smaller sub-tiles that will each fit within the tile buffer (one after another), and then control the graphics processing pipeline to generate and write out each respective sub-tile in turn. Thus, for example, 16×16 tiles that are too large to fit within the tile buffer can instead be processed, e.g. as four successive 8×8 tiles. The frame buffer descriptor is used to indicate the tile size to be generated, thereby controlling the tile size that the graphics processing pipeline will produce.

FIG. 4 is a flow chart illustrating these processes. As shown in FIG. 4, the driver 4 first determines the tile buffer memory that will be required for each tile of the render output (step 51). If this is less than the capacity of the tile buffer (step 52), the driver 4 allocates respective tile buffer regions to the tiles for each render target (step 53), generates appropriate render target and frame buffer descriptors (step 54) and outputs the descriptors and the graphics processing commands to the graphics processing pipeline (step 55).

On the other hand, if at step 52 it is determined that the tile buffer memory does not have the capacity to store the render targets at the tile size specified by the application, the driver 4 determines a smaller sub-tile size for which the data will fit within the tile buffer (step 56), and then allocates respective tile buffer regions to the sub-tiles for each render target (step 53), generates appropriate render target and frame buffer descriptors (step 54) for the new tile size and outputs the descriptors and graphics processing commands to the graphics processing pipeline (step 55). In this case, the graphics processing pipeline will then generate each tile specified by the application as a plurality of smaller sub-tiles as specified by the driver 4.

The graphics processing pipeline will then generate successive tiles of the render target (and the appropriate number of render targets for each tile) in turn, storing the tile data appropriately in the tile buffer, and writing the desired render target data out to external memory, such as a frame buffer for a display (and for display).

An example of the use of the present embodiment to perform deferred shading operations will now be described.

As shown in FIG. 2, the graphics processing pipeline 3 also includes a programmable processing stage in the form of a tile shader 34 that can read stored values in the tile buffer 30 to perform processing operations on those values, and then write the results of its processing operation either back to the tile buffer 30 or out to main memory via the tile write out unit 31. This tile shading operation accordingly makes use of the rendered fragment values produced by the fragment shader, etc., and stored in the tile buffer 30 as its inputs without requiring those fragment values to be written out to external memory and then read back through the graphics processing pipeline 3 in order to perform the tile shader processing operation. This allows a wide variety of processing operations to be performed with reduced memory bandwidth and energy consumption.

The tile shader stage 34 in the present embodiment shares processing circuitry with the fragment shader 26. Thus the tile shader 34 and the fragment shader 26 are provided by shared hardware in the form of a programmable hardware stage that can execute one sequence of graphics processing threads to first generate and then store in the tile buffer 30 fragment date values, and then execute a second sequence of graphics processing threads to process the fragment data values within the tile buffer 30.

(In other words, there is a programmable hardware element (circuitry) that can be configured by appropriate graphics program instructions to perform fragment shading operations (thereby acting as the fragment shader 26) or to perform tile shading operations (thereby acting as the tile shader 34). This programmable hardware element supports multithreaded processing and so can serve both these functions and others.)

In the present embodiment, the tile shader 34 is implemented by extending the OpenGL ES shading language with a new shader type, GL_TILE_SHADER, and new built-in variables. This allows support for the tile shader stage 34 to be fitted within the existing shader programming model. This new shader type is not attached to the program object, but rather to the frame buffer object. In the present embodiment the tile shader 34 works like a regular OpenGL ES shader, but allows functions for reading and writing to generic memory, random write-access to textures using image write functions, and functions for reading and writing to the tile buffer.

The tile shader 34 is able to read as inputs for any given processing operation (e.g. thread) any location within the tile in the tile buffer 30, and also to write data to any location within the tile that is stored in the tile buffer 30. This is facilitated in the present embodiment by means of the following API functions:

gl_ReadTilePixelColor (int2 loc, cb, ms)
gl_ReadTilePixelDepth (int2 loc, ms)
gl_WriteTilePixelColor (int2 loc, cb, ms, color)
gl_WriteTilePixelDepth (ing2 loc, ms, color)
where
cb=index of colour buffer (this is used where there are multiple render targets (multiple colour buffers) stored in the tile buffer 30),
ms=index of sample (where multisampling is facilitated) and
loc=pixel coordinates in screen space.

Write out from the tile shader 34 can be done either with generic load/store to memory from the tile shader 34 or by writing the data back to tile buffer 30 and then triggering fixed function write out by the write out unit 31.

The tile shader 34 is also able to trigger or prevent a regular write-out of specific tile buffer components. This is achieved in the present embodiment by calling a function, gl_WriteOutColorTile (cb, [s]), gl_WriteOutDepthTile asp, where cb is the colour buffer index and s is the sample index to use (this index controls what sample to write out as the final value). These functions flag the tile for write out (or not) of the colour or depth buffer. (The write out (if required) occurs after the tile shader has finished its processing.)

In the present embodiment, the operation of the tile shader 34 is triggered by use of an API call for that purpose:
glResolveTiles (x, y, w, h, xthreads, ythreads)

The effect of this "resolve" API call is that a "resolve" (begin tile processing/tile shader triggering) command is added to the command list of each tile containing pixels within the rectangle indicated in the resolve API call ((x, y, w, h) in pixel coordinates).

Then, when a tile is being processed by the graphics processing pipeline and a "resolve" command is encountered in the tile command list, the graphics processing pipeline 3 operates as follows.

First, it waits for all generated fragment threads for the current tile to complete and be committed to the tile buffer. This ensures that the tile buffer contains the final rendered data for the tile in question before the tile shader 34 begins its operation.

Tile shader threads are then issued for each location that lies within the current tile to execute the tile shader program for each location that lies within the current tile. Each thread performs the relevant tile shading process for a given pixel within the tile, and may access as its inputs data from sample positions associated with different pixels as well as or instead of the pixel it is actually "processing". Once all the tile shading threads have completed, the command list is then resumed.

In the present embodiment the tile shader 34 is used to perform a deferred processing operation on the rendered tiles in the tile buffer 30 before they are written to external memory. This may be to perform deferred lighting or any other desired deferred shading operation.

The tile shader 34 can be used to allow the entire deferred shading process to be done on a tile-by-tile basis, thereby saving significantly on external memory bandwidth for performing deferred shading. To do this, the tile buffer 30 is configured to be able to hold multiple render targets simultaneously in the manner discussed above such that multiple G-buffers and a colour buffer for accumulating the output results can be stored in the tile buffer 30 simultaneously.

In this process, the graphics processing pipeline 3 is first controlled to render to respective separate render targets, the rendered geometry (G-buffers) required for the deferred shading operation. This processing pass may generate, for example, render targets comprising colour, depth, surface normals, and other attributes that are then, for each respective tile of the overall render output (e.g. frame) to be generated, stored separately in the tile buffer 30. (As is known in the art, when performing deferred shading, these values are then used to do complex light calculations and composition to produce the final desired output result.)

Once these render targets have been generated for the tile in question, the tile shader 34 operation can then be triggered by including an appropriate resolve command in the tile command list, with the tile shader 34 being appropriately controlled to read data from the plural render targets in the tile buffer 30, process that data, and then write the processing result into a separate output colour buffer render target in the tile buffer 30.

In this operation, the tile shader 34 will accordingly read as input values stored sample values from some or all of the generated render targets that are stored in the tile buffer 30, perform a deferred shading operation using those values and then store the result of that operation in the separate output colour buffer that has been allocated for that purpose. Depending upon the exact deferred shading operation that is being performed, the tile shader 34 when performing the deferred shading operation for a given pixel may read only the sample values associated with that pixel in each render target and/or it may read sample values associated with one or more other (different) pixels in each render target. The tile shader 34 is configured to be able to perform either of these tasks under the control of appropriate graphics program instructions.

Once this operation has been completed, the tile shader 34 in an embodiment triggers the writing out of the output result render target to external memory, but disables writing the render targets that contain the G-buffers to memory, such that only the final tile that is to contribute to the frame buffer is written to memory. This can be achieved using the appropriate tile write functions discussed above. This saves both the read and write bandwidth to external memory that would otherwise be required for the multiple render targets that are generated in the first pass for the deferred shading operation.

The process should be repeated for each tile of the output to be generated, such that a final deferred shaded output, e.g. frame, can be generated.

Figure 5:
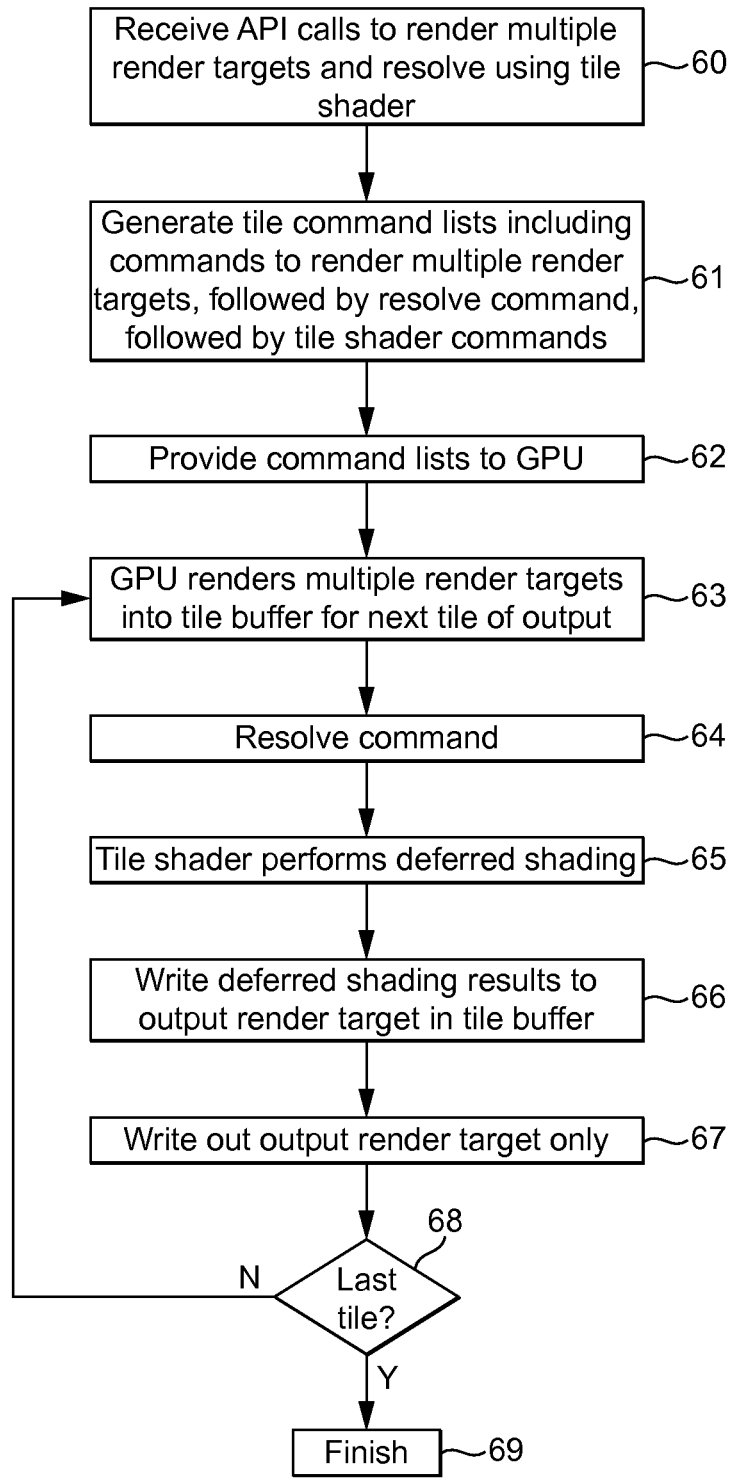
FIGS. 5 and 6 show schematically another embodiment of the operation of the graphics processing system of FIG. 1.
Figure 6:
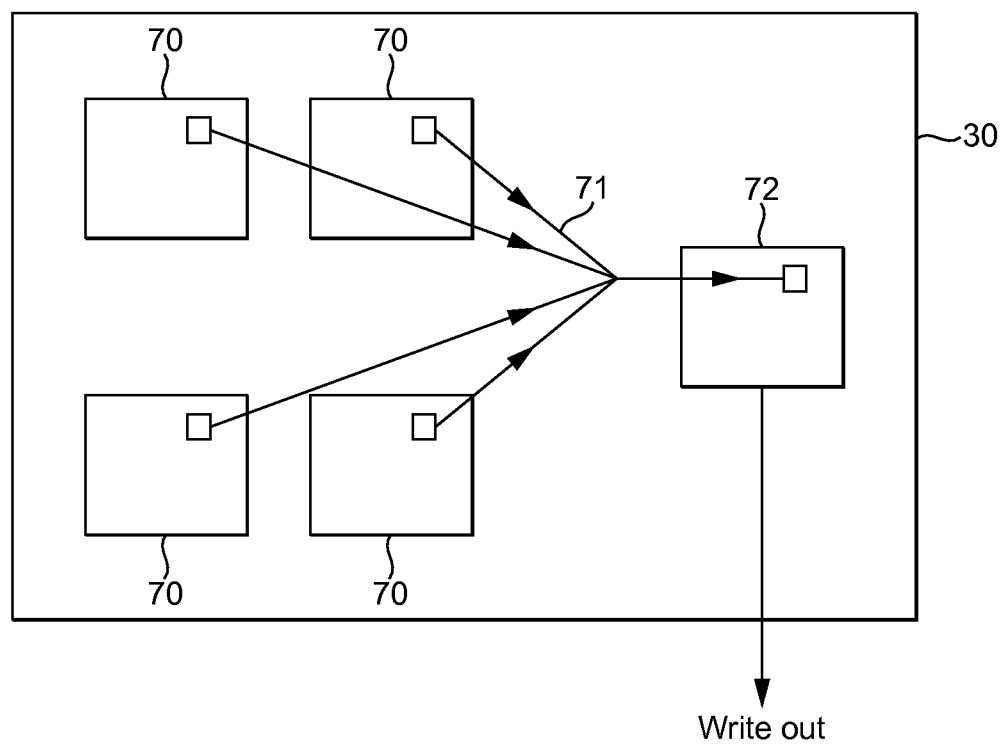

FIGS. 5 and 6 illustrate this process. FIG. 5 shows the process, and FIG. 6 shows schematically the arrangement of the render targets in the tile buffer 30.

As shown in FIG. 5, the driver for the graphics processing pipeline (that may, e.g., be running on a host processor) will receive API calls to render multiple render targets for a deferred shading operation, and to then perform a tile shader "resolve" operation to perform the deferred shading operation(s) on the multiple render targets (step 60). In response to this, the driver will generate appropriate tile command lists, including commands to render the multiple input render targets, followed by a "resolve" command to trigger the tile shader operation, and commands to cause the tile shader to perform the deferred shading operation (step 61).

These command lists are then provided to the graphics processing pipeline (step 62) which then, in response to the commands, renders the multiple input data render targets for each tile of the overall render output in turn (step 63) to store the multiple input data render targets 70 on a tile-by-tile basis in the tile buffer 30. As the multiple render targets for each tile are rendered, when the graphics processing pipeline sees the tile "resolve" command (step 64), it waits until all the rendering operations in flight have been completed and then executes the appropriate tile shader program to perform the deferred shading operation(s) 71 using the stored multiple render targets (step 65). The result of the deferred shading operation is written to a further "output" render target 72 in the tile buffer 30 (step 66). Once the tile in question has been processed, the "output" render target tile 72 is written out to external memory while preventing the write out of the multiple input data value render targets 70 (step 67). The process then moves on to the next tile (step 68) until all the tiles for the render output have been processed (step 69).

As will be appreciated from the above, the technology described herein in its embodiments at least can provide a system that can in particular provide flexible and efficient support for multiple render targets in a tile-based graphics processing system.

This is achieved in the embodiments of the technology described herein at least by allocating tile buffer memory to respective render targets to be generated on-the-fly (in use) based on an assessment of the actual memory requirements for the render targets in question.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A tile-based graphics processing system comprising:
   a graphics processing pipeline comprising:
      a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
      a tile buffer configured to store rendered fragment data locally to the graphics processing pipeline prior to that data being written out to an external memory, the tile buffer comprising an allocated amount of memory for use as the tile buffer;
      write out stage circuitry configured to write data stored in the tile buffer to an external memory; and
   wherein the graphics processing system further comprises:
      a memory allocator configured to determine the tile data storage requirements for each render target to be generated for a render output to be generated by the graphics processing system and operable to allocate portions of the memory allocated for use as the tile buffer to respective ones of the render targets based on the determination;
   wherein each render target to be stored in the tile buffer has state information associated with it that indicates the tile buffer region that data for the render target in question should be written to; and
   wherein the state information for each render target also indicates one or more of: the format that the data for the render target is to be stored in whether write out of the render target to external memory is enabled; where the render target data should be written to in external memory; and how the data should be written out to external memory.

2. The system of claim 1, wherein the driver for the graphics processing pipeline acts as the memory allocator.

3. The system of claim 1, wherein the tile buffer is apportioned between the different render targets by allocating different addresses within the tile buffer memory space to the render targets.

4. The system of claim 1, wherein a frame buffer descriptor containing state information that is common to all the render targets for the render output being generated is generated and stored.

5. The system of claim 1, wherein the memory allocator, if it determines that the render targets for a given render output will not use all the tile buffer memory, determines whether a further render output can also be accommodated in the tile buffer and if so, apportions the tile buffer memory accordingly.

6. The system of claim 1, wherein the memory allocator, if it determines that the render target or targets for a given render output will require more than the available space in the tile buffer, sub-divides the tiles to be generated for the render output into plural smaller sub-tiles that will fit within the tile buffer, and the graphics processing pipeline is then controlled to generate each respective sub-tile.

7. The system of claim 1, wherein the render targets are render targets that are being generated as a part of a deferred shading operation and the render targets include both the input data for the deferred shading operation and a render target that is to be the output of the deferred shading operation.

8. A method of operating a tile-based graphics processing system that comprises:
   a graphics processing pipeline comprising:
      a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
      a tile buffer configured to store rendered fragment data locally to the graphics processing pipeline prior to that data being written out to an external memory, the tile buffer comprising an allocated amount of memory for use as the tile buffer; and
      write out stage circuitry configured to write data stored in the tile buffer to an external memory;
   the method comprising:
      when the graphics processing system is to generate a render output:
         determining the tile data storage requirements for each render target to be generated for the render output;

allocating portions of the memory allocated for use as the tile buffer to respective ones of the render targets based on the determination;

associating with each render target to be stored in the tile buffer state information that indicates the tile buffer region that data for the render target in question should be written to;

wherein the state information for each render target also indicates one or more of: the format that the data for the render target is to be stored in whether write out of the render target to external memory is enabled; where the render target data should be written to in external memory; and how the data should be written out to external memory; and the graphics processing pipeline when generating rendered tile data for a respective render target for the render output, storing the rendered tile data in the portion of the tile buffer allocated to that render target.

9. The method of claim 8, wherein the driver for the graphics processing pipeline acts as the memory allocator.

10. The method of claim 8, comprising apportioning the tile buffer between the different render targets by allocating different addresses within the tile buffer memory space to the render targets.

11. The method of claim 8, further comprising generating and storing a frame buffer descriptor containing state information that is common to all the render targets for the render output being generated.

12. The method of claim 8, further comprising if it is determined that the render targets for a given render output will not use all the tile buffer memory, determining whether a further render output can also be accommodated in the tile buffer and if so, apportioning the tile buffer memory accordingly.

13. The method of claim 8, further comprising if it is determined that the render target or targets for a given render output will require more than the available space in the tile buffer, sub-dividing the tiles to be generated for the render output into plural smaller sub-tiles that will fit within the tile buffer, and controlling the graphics processing pipeline to then generate each respective sub-tile.

14. The method of claim 8, wherein the render targets are render targets that are being generated as a part of a deferred shading operation and the render targets include both the input data for the deferred shading operation and a render target that is to be the output of the deferred shading operation.

15. A non-transitory computer readable storage medium storing computer software code which when executing on a processor performs a method of operating a tile-based graphics processing system that comprises:

a graphics processing pipeline comprising:
a plurality of processing stages, including at least a rasteriser that rasterises input primitives to generate graphics fragments to be processed, each graphics fragment having one or more sampling points associated with it, and a renderer that processes fragments generated by the rasteriser to generate rendered fragment data;
a tile buffer configured to store rendered fragment data locally to the graphics processing pipeline prior to that data being written out to an external memory, the tile buffer comprising an allocated amount of memory for use as the tile buffer; and
write out stage circuitry configured to write data stored in the tile buffer to an external memory;

the method comprising:
when the graphics processing system is to generate a render output:
determining the tile data storage requirements for each render target to be generated for the render output;
allocating portions of the memory allocated for use as the tile buffer to respective ones of the render targets based on the determination;
associating with each render target to be stored in the tile buffer state information that indicates the tile buffer region that data for the render target in question should be written to;
wherein the state information for each render target also indicates one or more of: the format that the data for the render target is to be stored in whether write out of the render target to external memory is enabled; where the render target data should be written to in external memory; and how the data should be written out to external memory; and
the graphics processing pipeline when generating rendered tile data for a respective render target for the render output, storing the rendered tile data in the portion of the tile buffer allocated to that render target.

* * * * *

UNITED STATES PATENT AND TRADEMARK OFFICE
CERTIFICATE OF CORRECTION

PATENT NO.       : 9,070,200 B2
APPLICATION NO.  : 13/875831
DATED            : June 30, 2015
INVENTOR(S)      : Engh-Halstvedt It is certified that error appears in the above-identified patent and that said Letters Patent is hereby corrected as shown below:

In the Claims

Column 22, line 12, claim 1: After "stored" and before "whether", please delete "in" and insert -- in; --

Column 23, line 10, claim 8: After "stored" and before "whether", please delete "in" and insert -- in; --

Column 24, line 36, claim 15: After "stored" and before "whether", please delete "in" and insert -- in; --

Signed and Sealed this
Twenty-sixth Day of April, 2016

Michelle K. Lee
*Director of the United States Patent and Trademark Office*